(12) United States Patent
Akita et al.

(10) Patent No.: US 8,352,177 B2
(45) Date of Patent: Jan. 8, 2013

(54) NAVIGATION APPARATUS

(75) Inventors: Takashi Akita, Kanagawa (JP); Takahiro Kudoh, Kyoto (JP); Tsuyoshi Kindo, Osaka (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 12/293,582

(22) PCT Filed: Mar. 22, 2007

(86) PCT No.: PCT/JP2007/055824
§ 371 (c)(1),
(2), (4) Date: Sep. 19, 2008

(87) PCT Pub. No.: WO2007/119472
PCT Pub. Date: Oct. 25, 2007

(65) Prior Publication Data
US 2010/0161208 A1   Jun. 24, 2010

(30) Foreign Application Priority Data

Mar. 28, 2006   (JP) ................................. 2006-088490

(51) Int. Cl.
G09G 5/00 (2006.01)
G06F 17/00 (2006.01)
G08G 1/123 (2006.01)
G08G 1/09 (2006.01)
G01C 21/30 (2006.01)
G01C 21/34 (2006.01)

(52) U.S. Cl. ........ 701/410; 701/428; 701/437; 701/533; 340/995.2; 340/995.27; 345/629; 345/633

(58) Field of Classification Search .............. 701/1, 200, 701/206–211, 213, 300, 400, 408, 409, 410, 701/411, 425, 428, 431, 432, 436, 437, 438, 701/445, 446, 454, 457, 459, 465, 466, 467, 701/468, 487, 516, 523, 532, 533; 340/988, 340/995.17, 995.19, 995.2, 995.26, 995.27; 345/619, 620, 621, 625, 629, 630, 632, 633, 345/634

See application file for complete search history.

(56) References Cited

FOREIGN PATENT DOCUMENTS
| | | |
|---|---|---|
| CA | 2 514 701 | 3/2006 |
| EP | 1 024 347 | 8/2000 |
| EP | 1 435 508 | 7/2004 |

(Continued)

OTHER PUBLICATIONS

Extended European Search Report issued May 8, 2012 in European Patent Application No. 07 739 267, which is a foreign counterpart of the present application.

*Primary Examiner* — Thomas Tarcza
*Assistant Examiner* — Edward Pipala
(74) *Attorney, Agent, or Firm* — Wenderoth Lind & Ponack, L.L.P.

(57) ABSTRACT

A navigation apparatus dynamically sets a frequency of updating a guide arrow in accordance with certain circumstances. The navigation apparatus performs the route guidance by displaying the photographed image and includes a searching section for searching a route from a current position to a destination; and a drawing section for displaying the guide arrow which indicates the route searched by the searching section such that the guide arrow is superimposed on the photographed image, wherein the drawing section dynamically sets a frequency of updating a display of the guide arrow based on a predetermined condition.

20 Claims, 11 Drawing Sheets

FOREIGN PATENT DOCUMENTS

| | | |
|---|---|---|
| JP | 7-63572 | 3/1995 |
| JP | 9-325042 | 12/1997 |
| JP | 10-132598 | 5/1998 |
| JP | 10-339646 | 12/1998 |
| JP | 11-23305 | 1/1999 |
| JP | 2000-221048 | 8/2000 |

F I G. 2

(A) NODE DATA

| NODE ID | ATTRIBUTE | VALUE |
|---|---|---|
| Node1 | LATITUDE | N1 |
| | LONGITUDE | E1 |
| | THE NUMBER OF CONNECTING LINKS | 4 |
| | CONNECTING LINK ID | L1, L3, L8, L12 |
| ... | ... | ... |

(B) INTERPOLATION NODE DATA

| NODE ID | ATTRIBUTE | VALUE |
|---|---|---|
| CN1 | LATITUDE | N2 |
| | LONGITUDE | E2 |
| | EXISTING LINK ID | L1 |
| ... | ... | ... |

(C) LINK DATA

| LINK ID | ATTRIBUTE | VALUE |
|---|---|---|
| L1 | INITIAL NODE | Node1 |
| | TERMINAL NODE | Node5 |
| | LINK LENGTH | 700 |
| | CATEGORY | GENERAL ROAD |
| | THE NUMBER OF INTERPORATED NODES | 2 |
| | INTERPOLATION NODE ID [1] | CN1 |
| | INTERPOLATION NODE ID [2] | CN2 |

NAVIGATION APPARATUS

BACKGROUND OF THE INVENTION

1. Technical Field

The present invention relates to a navigation apparatus and more particularly, to a navigation apparatus operable to perform route guidance by using a camera image obtained by shooting a scene ahead of a vehicle.

2. Background Art

Conventionally, in widespread use is a navigation apparatus which performs route guidance by searching a route from a current self-position of a vehicle to a destination which has been set and by using map data accumulated with respect to branching points present on the route. In recent years, owing to an increase in a capacity of a storage medium such as an HDD and a DVD, a navigation apparatus is capable of storing further detailed map data. In pursuit of easy viewability and reality of a guidance display, a variety of map representations, such as a three-dimensional bird's-eye view representation and a driver's view presentation using realistic three-dimensional CG, have been adopted.

In addition, there has been proposed a driving guide image displaying method used in an on-vehicle navigation apparatus. In the method, an image of a scene ahead of a vehicle is obtained by using shooting means such as a video camera and when the vehicle approaches an intersection to which the vehicle is to be guided, a guide arrow is displayed in the image of the scene ahead of the vehicle in a superimposed manner as route information indicating a route in the intersection, along which the vehicle is to travel, thereby performing further accurate and easily viewable route guidance (refer to Patent Document 1).

[Patent Document 1] Japanese Patent Application Laid-Open Publication No. 7-63572

However, the conventional method is not capable of dynamically changing a frequency of updating a shape of the guide arrow. In reality, when a distance to an intersection to which the vehicle is to be guided is large, no deviation of the guide arrow to be displayed in the camera image occurs and therefore, the frequency of updating the guide arrow can be set to be low (for example, a frequency of one time per second); and when a distance to an intersection to which the vehicle is to be guided is small, a deviation of the guide arrow to be displayed in the camera image increases and therefore, the frequency of updating the guide arrow can be set to be high (for example, a frequency of three times per second), whereby an appropriate frequency of updating the guide arrow varies depending on circumstances.

Accordingly, in the conventional method in which the shape of the guide arrow is updated at an invariably constant frequency, in a case where an updating frequency of drawing the arrow, which has been previously set, is low, a deviation of the guide arrow to be displayed in the image in the vicinity of an intersection to which the vehicle is to be guided increases, thereby resulting in poor viewability of a guide display. In addition, in a case where a previously set frequency of updating the guide arrow is high, the guide arrow is updated at a high frequency even in the situation where a high updating frequency is not intrinsically required, such as the situation where a distance to an intersection to which the vehicle is to be guided is large, thereby leading to an increase in a processing load exerted on the navigation apparatus.

In consideration of the above-described problem, the present invention was made. In other words, an object of the present invention is to provide a navigation apparatus operable to, in route guidance using a photographed image, dynamically set a frequency of updating the guide arrow in accordance with circumstances.

SUMMARY OF THE INVENTION

The present invention relates to a navigation apparatus operable to perform route guidance by displaying a photographed image. The present invention comprises: a searching section for searching a route from a current position to a destination; and a drawing section for displaying a guide arrow which indicates the route searched by the searching section such that the guide arrow is superimposed on the photographed image. In the navigation apparatus, the drawing section dynamically sets a frequency of updating a display of the guide arrow based on a predetermined condition.

It is preferable that the drawing section sets the frequency of updating the display of the guide arrow in accordance with a distance from a self-position of a vehicle to a point to which the vehicle is to be guided. Note that the point to which the vehicle is to be guided is an intersection or a branching point to which the vehicle is to be guided through navigation (intersection to which the vehicle is to be guided).

It is preferable that the drawing section increases the frequency of updating the display of the guide arrow in accordance with an increase in the distance from the self-position of the vehicle to the point to which the vehicle is to be guided.

Thus, at a point where a deviation per time of the displayed guide arrow with respect to a camera image is small (position where the vehicle is distant from an intersection to which the vehicle is to be guided), the rate of drawing the guide arrow is set to be relatively low. Therefore, an effective guidance display can be presented with a low processing load. On the other hand, at a point where a deviation per time of the displayed guide arrow with respect to a camera image is large (position where the vehicle is close to an intersection to which the vehicle is to be guided), the rate of drawing the guide arrow is set to be relatively high. Therefore, the deviation of the displayed guide arrow with respect to the camera image can be made small and an effective guidance display can be presented to a user.

It is preferable that the drawing section sets the frequency of updating the display of the guide arrow in accordance with a rudder angle of a steering wheel. In addition, it is preferable that the drawing section increases the frequency of updating the display of the guide arrow in accordance with an increase in the rudder angle of the steering wheel.

It is preferable that the drawing section sets the frequency of updating the display of the guide arrow in accordance with a change amount per unit time of the rudder angle of the steering wheel. In addition, it is preferable that the drawing section increases the frequency of updating the display of the guide arrow in accordance with an increase in the change amount per unit time of the rudder angle of the steering wheel.

Thus, when a deviation per time of the displayed guide arrow with respect to the camera image is small (when the rudder angle of the steering wheel is small), the rate of drawing the guide arrow is set to be relatively low. Therefore, an effective guidance display can be presented with a low processing load. On the other hand, when a deviation per time of the guide arrow with respect to the camera image is large (when the rudder angle of the steering wheel is large), the rate of drawing the guide arrow is set to be relatively high. Therefore, the deviation of the displayed guide arrow with respect to the camera image can be made small and an effective guidance display can be presented to a user.

It is preferable that the drawing section sets the frequency of updating the display of the guide arrow in accordance with a shape of a road ahead of the vehicle.

It is preferable that the drawing section increases the frequency of updating the display of the guide arrow in accordance with an increase in a discrepancy between the shape of the road ahead of the vehicle and a shape of a course which would be taken if the vehicle proceeded along a traveling direction of the vehicle.

Thus, when a deviation per time of the displayed guide arrow with respect to the camera image is small (when the rudder angle of the steering wheel is small), the rate of drawing the guide arrow is set to be relatively low. Therefore, an effective guidance display can be presented with a low processing load. On the other hand, when a deviation per time of the guide arrow with respect to the camera image is large (when the rudder angle of the steering wheel is large), the rate of drawing the guide arrow is set to be relatively high. Therefore, the deviation of the displayed guide arrow with respect to the camera image can be made small and an effective guidance display can be presented to a user.

It is preferable that the drawing section dynamically sets the frequency of updating the display of the photographed image in accordance with a predetermined condition.

As described above, the present invention enables providing a navigation apparatus operable to, in route guidance using a photographed image, dynamically set a frequency of updating a guide arrow in accordance with circumstances.

BRIEF DESCRIPTION OF THE DRAWINGS

FIG. 2 shows one example of information stored in a map DB.

Figure 1:
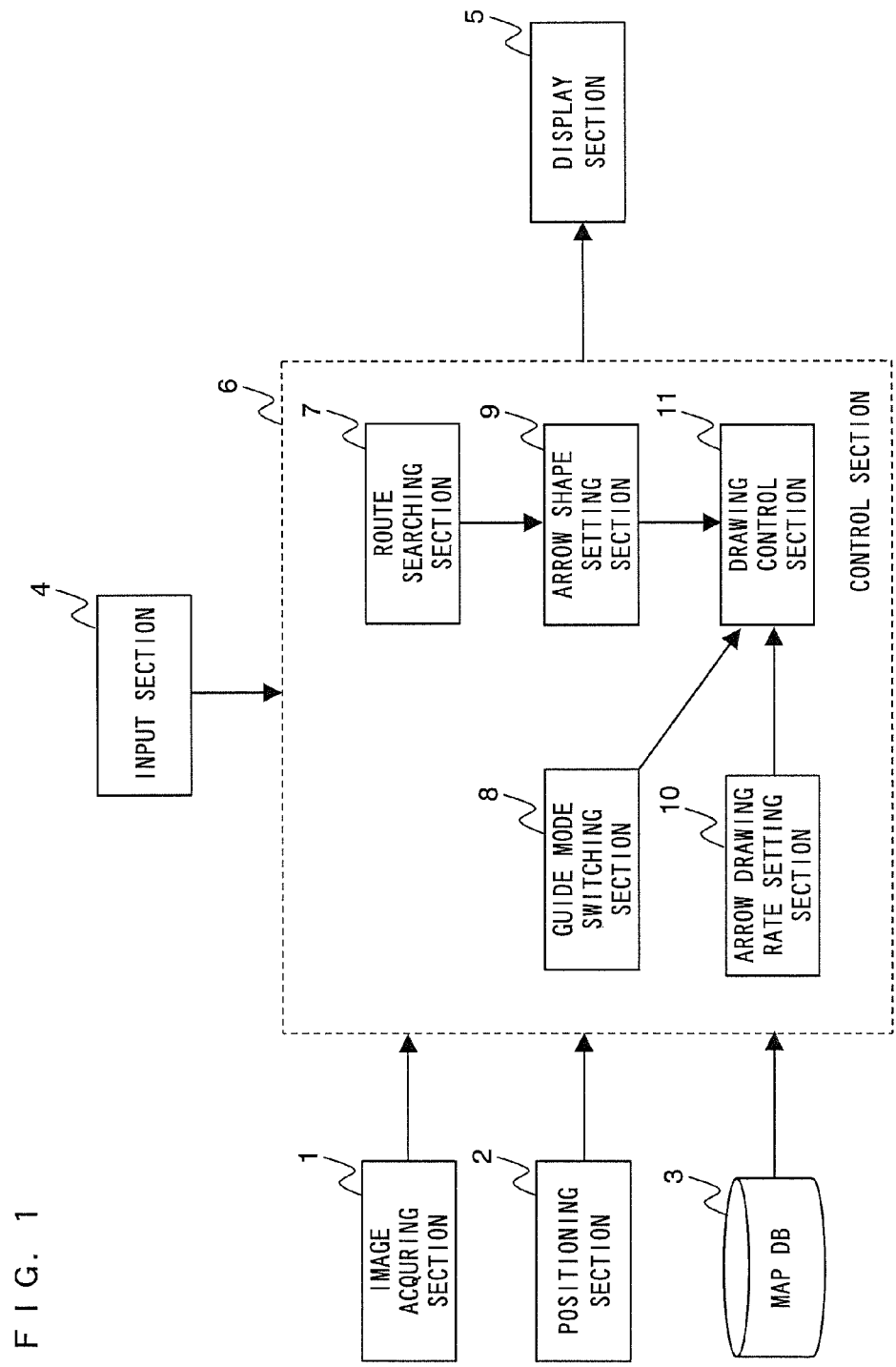
FIG. 1 is a schematic diagram illustrating a configuration of a navigation apparatus according to the present invention.

DESCRIPTION OF THE REFERENCE CHARACTERS 1, 101 image acquiring section
2, 102 positioning section
3, 103 map DB
4, 104 input section
5, 105 display section
6, 106 control section
7, 107 route searching section
8, 108 guide mode switching section
9, 109 arrow shape setting section
10 arrow drawing rate setting section
110 photographed image updating rate setting section
11, 111 drawing control section

DETAILED DESCRIPTION OF THE INVENTION

Embodiment

Hereinafter, a navigation apparatus of the present invention will be described with reference to drawings. Note that components irrelevant to the present invention are omitted in the drawings.

FIG. 1 is a block diagram illustrating a whole configuration of the navigation apparatus according to an embodiment of the present invention. The navigation apparatus comprises: an image acquiring section 1, a positioning section 2, a map DB 3, an input section 4, a display section 5, and a control section 6.

The image acquiring section 1 is, for example, a camera for shooting an image of a scene ahead of a vehicle. The positioning section 2 is a GPS (Global Positioning System), a vehicle speed sensor and/or a gyro-sensor, which is mounted on the vehicle, for acquiring information pertinent to a self-position of the vehicle.

The map DB 3 is, for example, an HDD or a DVD having stored thereon map information such as data pertinent to roads and intersections. However, the present invention is not limited thereto, and information which is to be stored on the map DB 3 may be appropriately downloaded from center equipment by using communication means (for example, a mobile telephone), not shown.

FIG. 2 shows data, among the map information stored on the map DB 3, exerpted from information pertinent to the embodiment. The map DB 3 contains (A) node data, (B) interpolation node data, and (C) link data. The (A) node data is pertinent to nodes, such as intersections and junctions, which are points at which roads branch in some directions and comprises: positional information, such as a latitude and a longitude, with respect to each of the nodes; the number of the below-described links which connect the nodes; and link IDs. The (B) interpolation node data is pertinent to curving points which are present on the below-described links, represents shapes, for example, in a case where a link is not linear, and comprises: positional information such as a latitude and a longitude; and IDs of the links on which the curving points are present. The (C) link data is pertinent to roads connecting between nodes and comprises: initial nodes and terminal nodes which are end points of the links; lengths of the links (units are in meters, kilometers, and the like); road categories such as a general road and an expressway; the numbers of the above-mentioned interpolation nodes; and IDs of the interpolation nodes. Note that the link data may contain information pertinent to road widths and the numbers of lanes.

Figure 3:
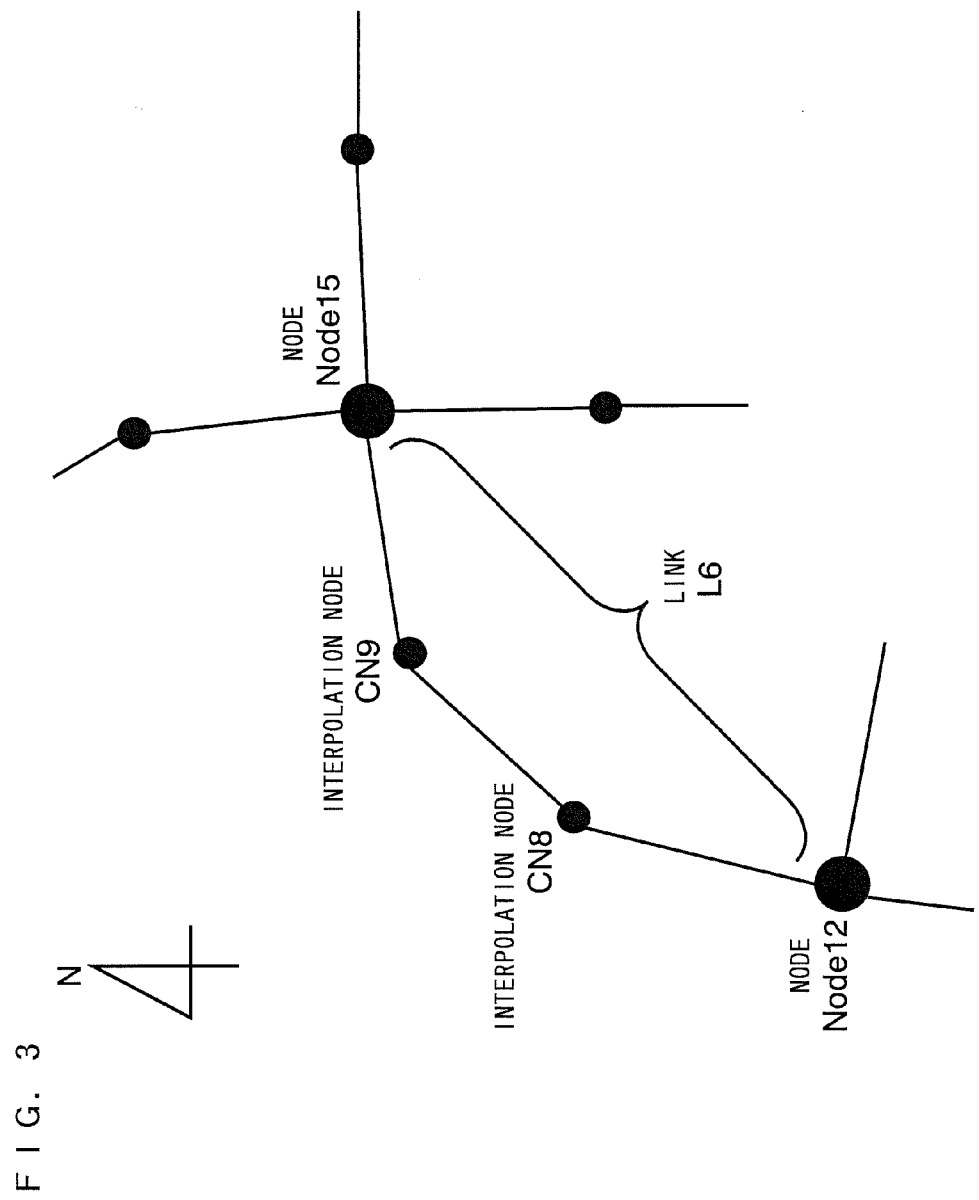
FIG. 3 is a diagram illustrating one example of a network of branching points, which is formed by nodes, interpolation nodes, and a link whose information is stored in the map DB.

An example of a network of roads and nodes, which is represented by such map data, is shown in FIG. 3. As shown in FIG. 3, the nodes are connected via three or more links and interpolation nodes for shaping a link are present on the link. Note that in a case where a link is a linear road, the interpolation nodes are not necessarily present.

The input section 4 is a remote control, a touch panel, or a microphone as a voice input device, for inputting, to the navigation apparatus, information pertinent to a destination. The display section 5 is, for example, a display for displaying a map image and a photographed image. The control section 6 is, for example, a CPU and comprises: a route searching section 7; a guide mode switching section 8; an arrow shape setting section 9; an arrow drawing rate setting section 10; and a drawing control section 11.

The route searching section 7 searches a route to reach a destination by referring to information pertinent to the destination, which has been inputted by the input section 4, information pertinent to a self-position of a vehicle, which has been acquired by the positioning section 2, and the map DB 3.

The guide mode switching section 8 calculates a distance to an intersection through which the vehicle is going to pass next and to which the vehicle is to be guided, by referring to the information pertinent to a self-position of the vehicle acquired by the positioning section 2 and to the information pertinent to a route, to which the vehicle is to be guided, searched by the route searching section 7. When the distance from the self-position of the vehicle to the intersection to which the vehicle is to be guided is larger than a predetermined distance (guide mode switching distance), the guide mode switching section 8 sets a map guide mode in which guidance is performed by using a map image. When the distance from the self-position of the vehicle to the intersection to which the vehicle is to be guided is less than or equal to the predetermined distance, the guide mode switching section 8 sets a photographed image guide mode in which guidance is performed by using a photographed image.

The arrow shape setting section 9, when the guidance is performed in the photographed image guide mode, sets a shape and a position of the guide arrow superimposed on the photographed image, based on the information pertinent to the route, to which the vehicle is to be guided, searched by the route searching section 7 and on road shape data contained in the map DB 3.

Figure 4:
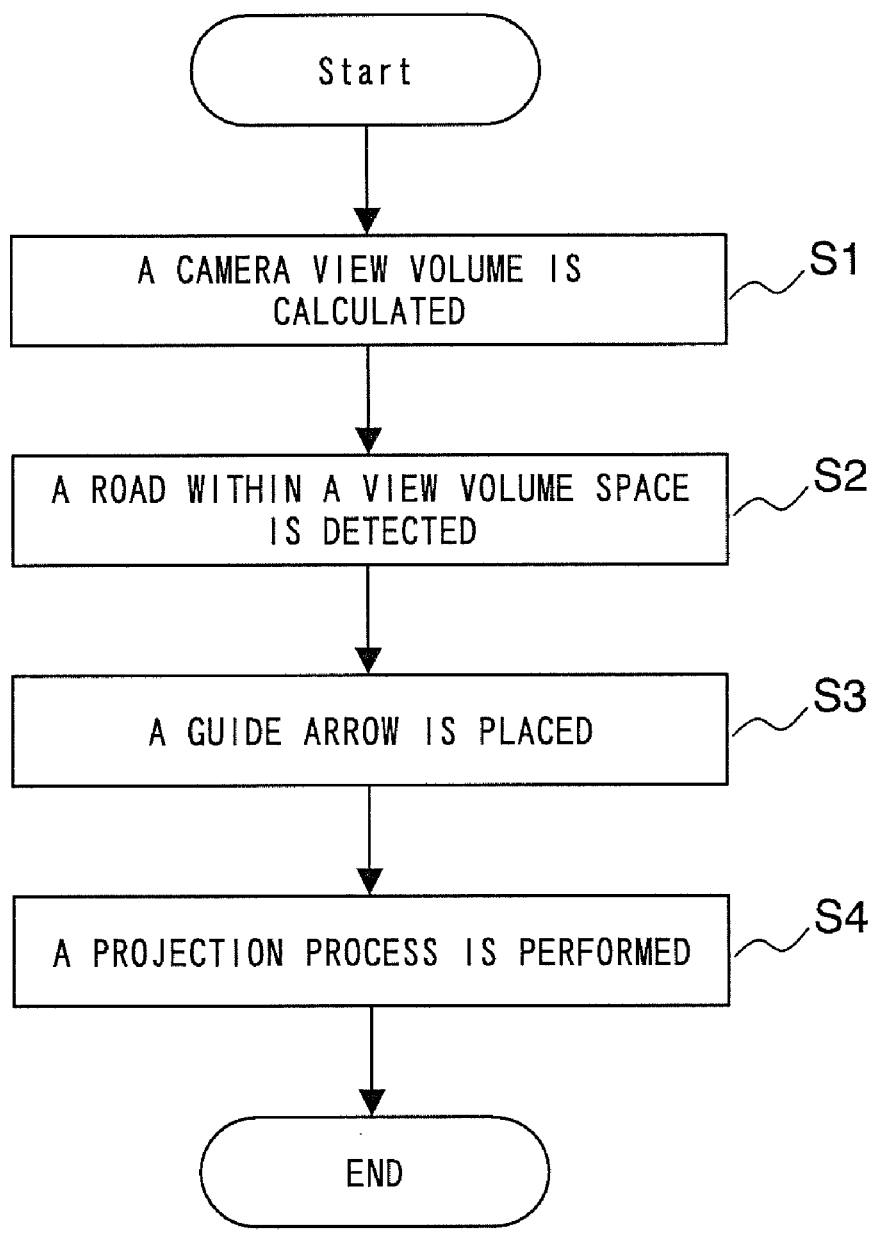
FIG. 4 is a flow chart showing a method of setting a shape and a position of a guide arrow.

Here, a method in which the arrow shape setting section 9 sets the shape and the position of the guide arrow will be described with reference to a flow chart shown in FIG. 4.

First, the arrow shape setting section 9 obtains a camera view volume in a three-dimensional map space based on the three-dimensional map contained in the map DB 3 and on a camera position, camera angles (a horizontal angle and an elevation angle), a focal distance, and an image size which are parameters used for determining a direction and a scope of shooting performed by the image acquiring section 1 (step S1). Here, the three-dimensional map is a map in which positional information is represented by a latitude, a longitude, and a height.

Figure 5:
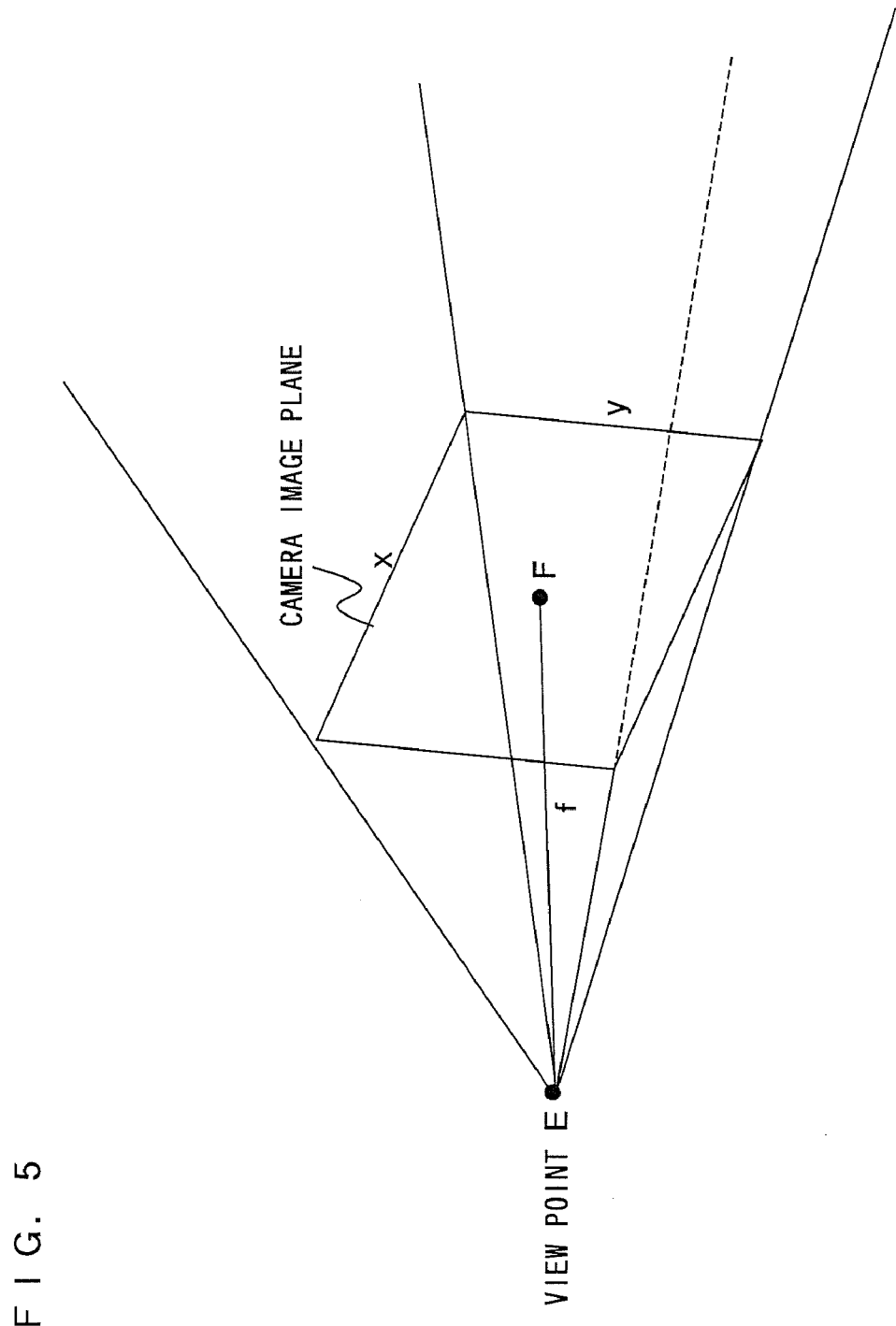
FIG. 5 is a diagram illustrating a method of setting a camera view volume in a three-dimensional map space.

The camera view volume is obtained by, for example, a method as shown in FIG. 5. In a three-dimensional map space, a point (point F) which is located at a focal distance f from a camera position (view point) E in a camera angle direction is obtained and there, a plane (camera image plane) having a breadth of x and a length of y, which corresponds to an image size, is set so as to be perpendicular to a vector spanning between the view point E and the point F. Next, a three-dimensional space which is made up of half lines extending from the view point E to points at four corners of the camera image plane is obtained. Although this three-dimensional space theoretically elongates to infinity, a three-dimensional space which is cut off at an appropriate distance from the view point E is defined as a view volume.

Note that by using a two-dimensional map with height information excluded, instead of the three-dimensional map, a camera view volume in a two-dimensional map space may be obtained. In addition, the parameters for obtaining the shooting direction and the shooting scope are not limited to the above-mentioned parameters. It is only required for the parameters to be able to be used for obtaining the shooting direction and the shooting scope and conversions may be made by using other parameters such as a field angle.

Figure 6:
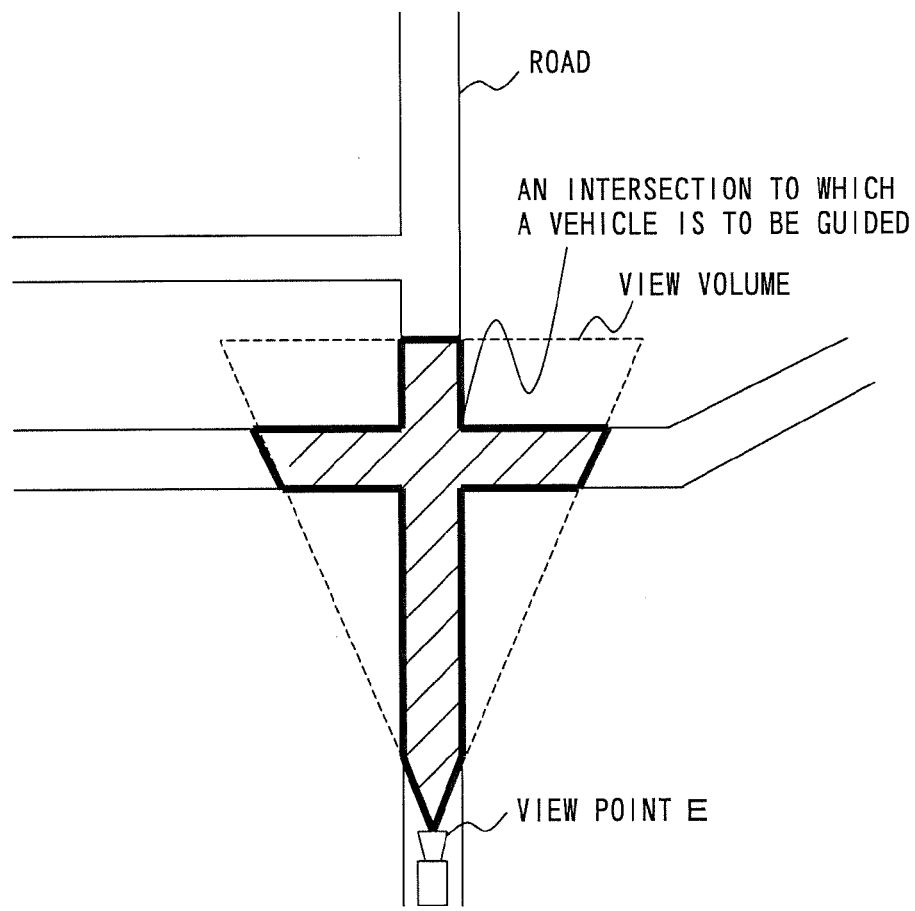
FIG. 6 is a diagram illustrating a road detected in a road detection process.

Next, the arrow shape setting section 9 performs a road detection process in which in the three-dimensional map space, roads which are present within the camera view volume and positions thereof are detected (step S2). In the road detection process, an overlap between the camera view volume and a road region in the three-dimensional map space is calculated. FIG. 6 shows a road detected in the road detection process. Note that FIG. 6 is a diagram in which the three-dimensional map space and the camera view volume are viewed from above. As shown in FIG. 6, the road (a diagonally shaded area) enclosed in the view volume is detected in the road detection process.

Figure 7:
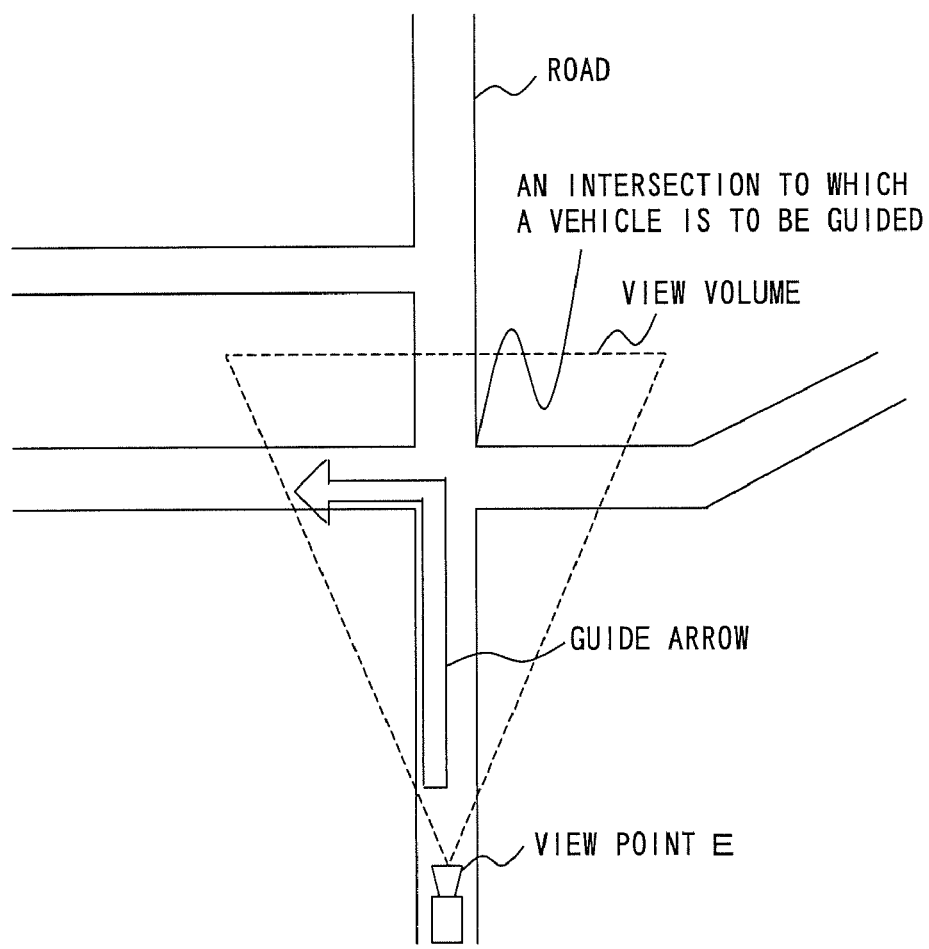
FIG. 7 is a diagram illustrating a position in the three-dimensional map space, at which the guide arrow is placed.

Next, in the three-dimensional map space, the arrow shape setting section 9 places the guide arrow at a position on a road, among the roads detected in the road detection process, which corresponds to the route, to which the vehicle is to be guided, searched by the route searching section 7 (step S3). In FIG. 7, the position where the guide arrow is placed is shown. Note that the shape of the guide arrow is not limited to the figure of the arrow shown in FIG. 7 and for example, a figure of a bent line, in which a triangle at the tip of the figure of the arrow is removed may be used.

Figure 8:
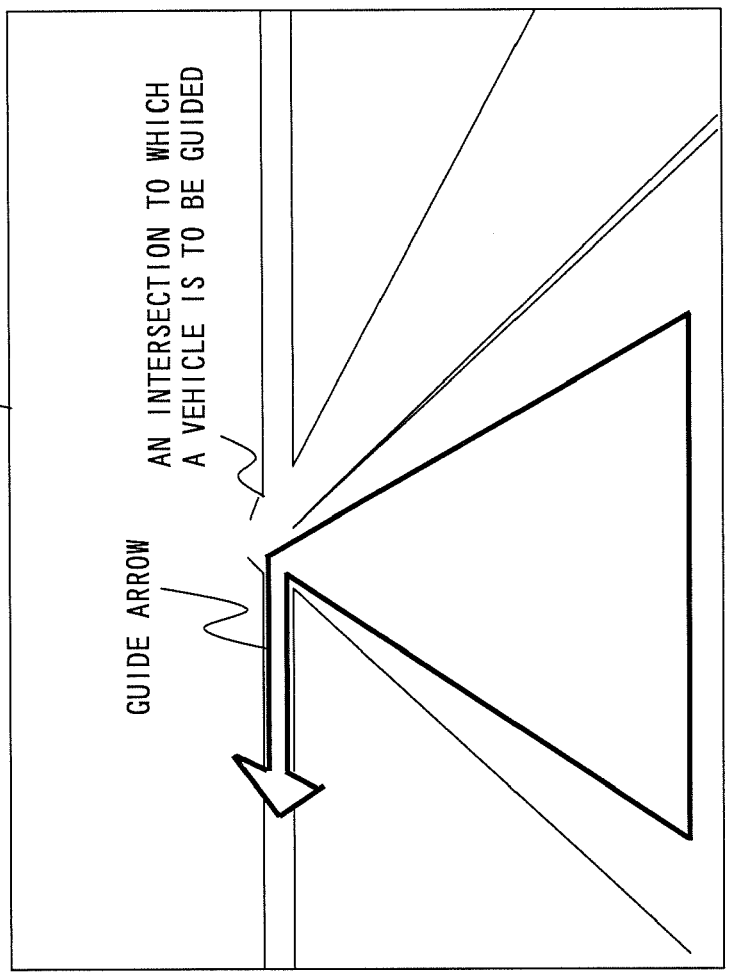
FIG. 8 is a diagram illustrating a guidance display indicated on a display section.

Next, the arrow shape setting section 9 performs projection transformation for the guide arrow by using the camera image plane shown in FIG. 5 as a projection plane (projection process at step S4). In the projection process, because the projection plane onto which the guide arrow is projected corresponds to the camera image plane of the image acquiring section 1, the guide arrow is superimposed on a position of the road (corresponding to the route to which the vehicle is to be guided) which appears on the photographed image, as shown in FIG. 8.

The arrow drawing rate setting section 10 sets a frequency (i.e., a rate of drawing the guide arrow) of updating a shape and a position of the guide arrow in the photographed image guide mode. The drawing rate is dynamically changed in accordance with a condition such as a distance from the self position of the vehicle to an intersection to which the vehicle is to be guided. Operations of the arrow drawing rate setting section 10 will be described later in detail.

The drawing control section 11 draws a map image in the map guide mode and draws a route in the map image by a color different from a color by which other roads are drawn. In the photographed image guide mode, the drawing control section 11 draws a guide arrow, set by the arrow shape setting section 9, on a photographed image. The photographed image is updated, for example, 30 times per second. On the other hand, the guide arrow is updated in accordance with a drawing rate set by the arrow drawing rate setting section 10.

Figure 9:
FIG. 9 is a flow chart showing operations of the navigation apparatus according to the present invention.

Next, operations of the navigation apparatus according to the present invention will be described with reference to drawings. FIG. 9 is a flow chart showing the operations of the navigation apparatus according to the present invention.

First, the control section 6 determines whether or not the input section 4 has set a destination on the navigation apparatus (step S11).

At step S11, when it is determined that a destination has not been set, the control section 6 stands by. On the other hand, at step S11, when it is determined that a destination has been set, the route searching section 7 searches a route to reach the destination based on information pertinent to a self-position of the vehicle, which has been acquired by the positioning section 2 (step S12).

Next, the control section 6 determines whether or not the vehicle has arrived at the destination (step S13).

At step S13, when it is determined that the vehicle has arrived at the destination, the control section 6 finishes the process. On the other hand, at step S13, when it is determined that the vehicle has not arrived at the destination, the control section 6 determines whether or not an intersection, to which the vehicle is to be guided, is present on the route from the self position of the vehicle to the destination (step S14).

At step S14, when it is determined that the intersection, to which the vehicle is to be guided, is not present on the route from the self position of the vehicle to the destination, guidance is performed in the map guide mode in which the map image is used for the guidance (S17). On the other hand, when it is determined that the intersection, to which the vehicle is to be guided, is present on the route from the self position of the vehicle to the destination, a distance from the self-position of the vehicle to the intersection through which the vehicle is going to pass next and to which the vehicle is to be guided is calculated (step S15). Note that hereinafter, it is assumed that a distance from the self-position of the vehicle to an intersection to which the vehicle is to be guided is periodically calculated.

Next, the guide mode switching section 8 determines whether or not a distance from the self-position of the vehicle to an intersection to which the vehicle is to be guided is larger than a guide mode switching distance (for example, 300 meters of a distance to reach the intersection to which the vehicle is to be guided) (step S16).

At step S16, when it is determined that the distance from the self-position of the vehicle to the intersection to which the vehicle is to be guided is larger than the guide mode switching distance, the guidance is performed in the map guide mode (step S17). On the other hand, at step S16, when it is determined that the distance from the self-position of the vehicle to the intersection to which the vehicle is to be guided is less than or equal to the guide mode switching distance, the guide mode is switched to the photographed image guide mode in which the photographed image acquired by the image acquiring section 1 is displayed and the guide arrow is superimposed on the photographed image (step S18).

Next, the control section 6 determines whether or not the vehicle has passed through the intersection to which the vehicle is to be guided (step S19).

At step S19, when it is determined that the vehicle has passed through the intersection to which the vehicle is to be guided, the guide mode switching section 8 determines again in which mode the guidance is performed (steps S14 through S16). When an intersection to which the vehicle is to be guided is not present on a route from a self-position of the vehicle to a destination is and when a distance from the self-position of the vehicle to a destination to which the vehicle is to be guided is larger than the guide mode switching distance, the guide mode is switched to the map guide mode. On the other hand, the distance from the self-position of the vehicle to the destination to which the vehicle is to be guided is less than or equal to the guide mode switching distance, the photographed image guide mode is continued. The route guidance is continued until the vehicle has arrived at the destination.

Next, operations in the photographed image guide mode will be described in detail. First, the arrow drawing rate setting section 10 sets the rate of drawing the guide arrow. The rate of drawing the guide arrow is set based on a distance from a self-position of the vehicle to an intersection to which the vehicle is to be guided. When the distance (arrow drawing rate switching distance) from the self-position of the vehicle to the intersection to which the vehicle is to be guided is greater than or equal to a predetermined distance (for example, 50 meters), the arrow drawing rate setting section 10 sets the rate of drawing the guide arrow to be relatively low (for example, one time per second). When the distance from the self-position of the vehicle to the intersection to which the vehicle is to be guided is less than the arrow drawing rate switching distance, the arrow drawing rate setting section 10 sets the rate of drawing the guide arrow to be relatively high (for example, three times per second).

In such a manner, at a point where a deviation per time of the displayed guide arrow with respect to a camera image is small (position where the vehicle is distant from an intersection to which the vehicle is to be guided), the rate of drawing the guide arrow is set to be relatively low. Thus, an effective guidance display can be presented with a low processing load. On the other hand, at a point where a deviation per time of the displayed guide arrow with respect to a camera image is large (position where the vehicle is close to an intersection to which the vehicle is to be guided), the rate of drawing the guide arrow is set to be relatively high. Thus, the deviation of the displayed guide arrow with respect to the camera image can be made small and an effective guidance display can be presented to a user. As described above, the rate of drawing the guide arrow is dynamically changed in accordance with a distance from a self-position of the vehicle to an intersection to which the vehicle is to be guided, whereby an appropriate drawing rate according to circumstances can be set.

Note that a method of setting the rate of drawing the guide arrow is not limited to the method shown in the above-described example. For example, the rate of drawing the guide arrow may be gradually increased in inverse proportion to a distance from a self-position of the vehicle to an intersection to which the vehicle is to be guided.

In addition, the rate of drawing the guide arrow may be dynamically changed in accordance with steering information pertinent to a user's steering operation, instead of a distance from a self-position of the vehicle to an intersection to which the vehicle is to be guided. In this case, the arrow drawing rate setting section 10 acquires a rudder angle of a steering wheel. When the rudder angle is greater than or equal to a predetermined angle or a change amount per unit time of the rudder angle is greater than or equal to the predetermined angle, a rate of drawing the guide arrow is set to be relatively high (for example, three times per second). When the rudder angle is less than the predetermined angle or the change amount per unit time of the rudder angle is less than the predetermined angle, a rate of drawing the guide arrow is set to be relatively low (for example, one time per second).

In such a manner, when a deviation per time of the displayed guide arrow with respect to the camera image is small (when the rudder angle of the steering wheel or the change amount per unit time of the rudder angle is small), the rate of drawing the guide arrow is set to be relatively low. Thus, an effective guidance display can be presented with a low processing load. On the other hand, when a deviation per time of the guide arrow with respect to the camera image is large (when the rudder angle of the steering wheel or the change amount per unit time of the rudder angle is large), the rate of drawing the guide arrow is set to be relatively high. Thus, the deviation of the displayed guide arrow with respect to the camera image can be made small and an effective guidance display can be presented to a user.

Furthermore, the rate of drawing the guide arrow may be dynamically changed based on a shape of a road ahead of the vehicle. Specifically, a degree of a discrepancy between the shape of the road ahead of the vehicle and a shape of a course which would be taken if the vehicle proceeded along a traveling direction of the vehicle is determined. When the discrepancy is small, the rate of drawing the guide arrow is set to be relatively low since the deviation of the guide arrow with respect to the camera image is small. When the discrepancy is large (at a curve or the like), the rate of drawing the guide arrow is set to be relatively high since the deviation of the guide arrow with respect to the camera image is large.

Figure 10:
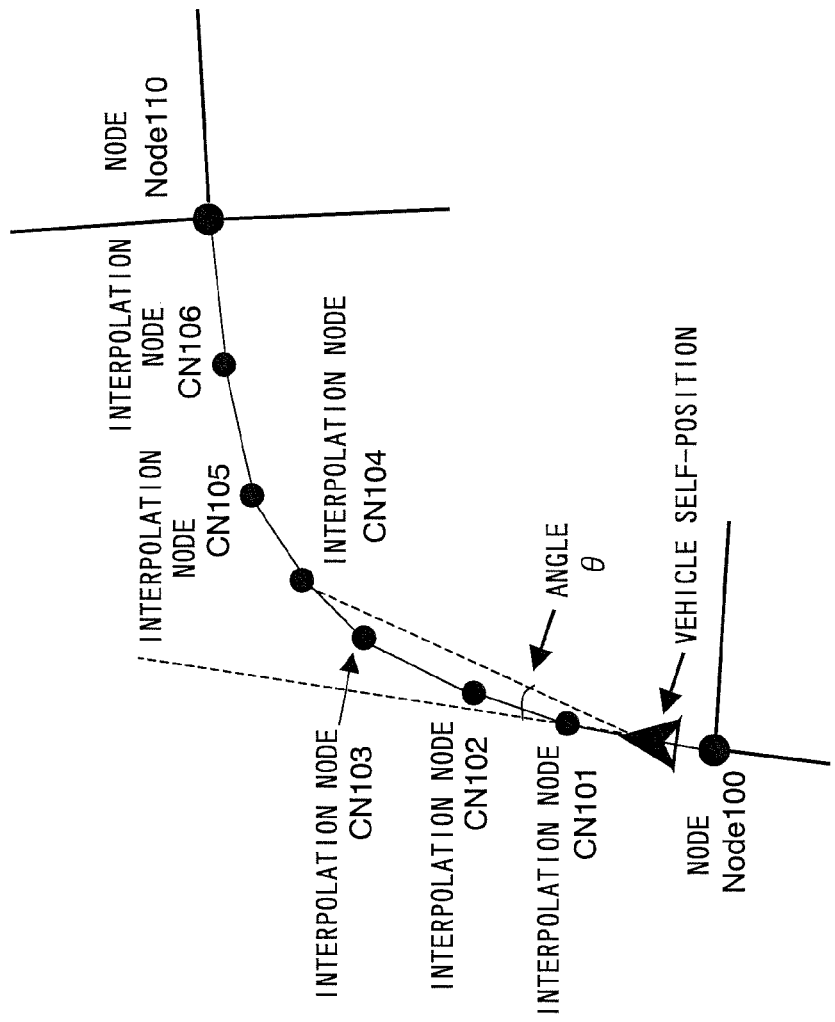
FIG. 10 is a diagram illustrating a method of determining a shape of a road ahead of a vehicle.

A method of determining the degree of the discrepancy between the shape of the road ahead of the vehicle and the shape of the course which would be taken if the vehicle proceeded along the traveling direction of the vehicle will be described with reference to FIG. 10. FIG. 10 shows map information (node data, interpolation node data, and link data) in the vicinity of a self-position of the vehicle, which has been stored in the map DB 3. The arrow drawing rate setting section 10 calculates a point which the vehicle would reach by proceeding from the self position of the vehicle along a road in the traveling direction by a predetermined distance (for example, 50 meters). The point which is located at the predetermined distance from the self-position of the vehicle toward the traveling direction of the vehicle is defined as a position indicated by node data or interpolation node data which is obtained when it is assumed that the vehicle would proceed from the self-position of the vehicle toward the traveling direction along nodes or interpolation nodes and a distance obtained by adding up distances, which the vehicle would travel from the self-position of the vehicle, exceeds a predetermined distance. Hereinafter, assuming that an interpolation node CN104 in FIG. 10 corresponds to the above-mentioned point, the description will be continued. The arrow drawing rate setting section 10 calculates an angle θ which is formed by the traveling direction of the vehicle and a direction toward the interpolation node CN104. When the angle θ is greater than or equal to a predetermined angle (for example, 10 degrees), the arrow drawing rate setting section 10 sets a rate of drawing the guide arrow to be relatively high (for example, three times per second). When the angle θ is less than the predetermined angle, the arrow drawing rate setting section 10 sets a rate of drawing the guide arrow to be relatively low (for example, one time per second).

As described above, the arrow drawing rate setting section 10 dynamically changes a rate of drawing the guide arrow in accordance with a distance from a self-position of the vehicle to an intersection to which the vehicle is to be guided, the information pertinent to a rudder angle of a steering wheel, and a shape of a road ahead of the vehicle. Note that as conditions under which the arrow drawing rate setting section 10 sets the rate of drawing the guide arrow, the above-described conditions may be each used separately and a plurality of the above-described conditions may be used in combination.

The arrow shape setting section 9 sets a shape and a position of the guide arrow in accordance with the rate of drawing the guide arrow, which is set by the arrow drawing rate setting section 10. The drawing control section 11 draws the guide arrow such that the guide arrow is superimposed on the photographed image acquired by the image acquiring section 1. The guide arrow is updated in accordance with the drawing rate set by the arrow drawing rate setting section 10.

Modified Example 1

Here, a first modified example of the navigation apparatus according to the present embodiment will be described. In the above-described embodiment, a rate of drawing the guide arrow is dynamically changed in accordance with circumstances. However, in the present modified example, not only the rate of drawing the guide arrow but also a rate of updating the photographed image are dynamically changed.

Figure 11:
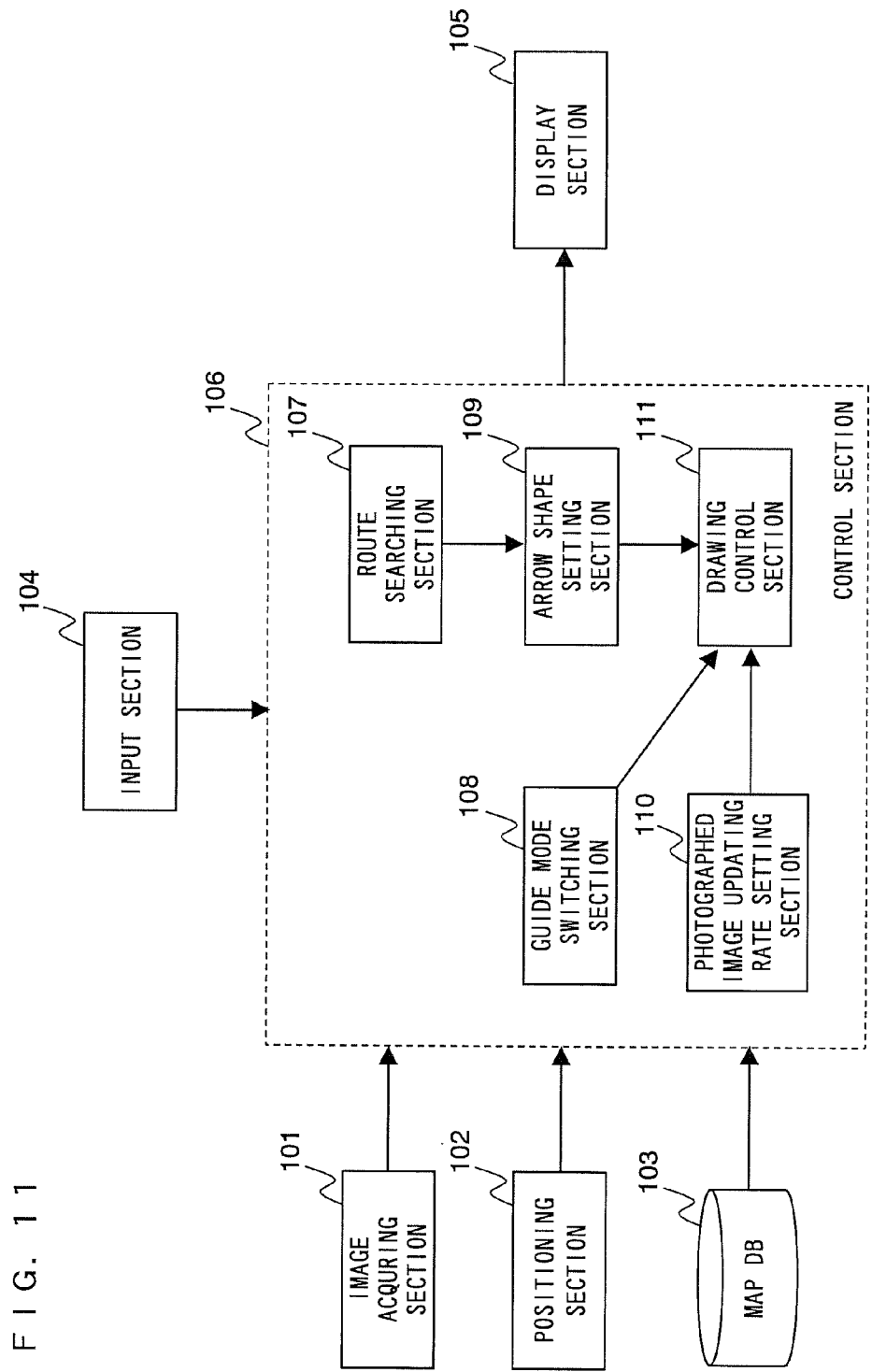
FIG. 11 is a schematic diagram illustrating a configuration of a navigation apparatus according to a modified example.

FIG. 11 is a block diagram illustrating a whole configuration of the navigation apparatus of the present modified example. As shown in FIG. 11, in the configuration of the navigation apparatus of the present modified example, the arrow drawing rate setting section 10 in the navigation apparatus shown in FIG. 1 is replaced with a photographed image updating rate setting section 110.

In the photographed image guide mode, the photographed image updating rate setting section 110 sets a rate of updating the photographed image. The rate of updating the photographed image is set in accordance with, for example, a distance from a self-position of the vehicle to an intersection to which the vehicle is to be guided. When the distance from the self-position of the vehicle to the intersection to which the vehicle is to be guided is greater than or equal to a predetermined distance (photographed image updating rate changing distance) (for example, 50 meters), the photographed image updating rate setting section 110 sets the rate of updating the photographed image to be relatively low (for example, one time per second). When the distance from the self-position of the vehicle to the intersection to which the vehicle is to be guided is less than the photographed image updating rate changing distance, the photographed image updating rate setting section 110 sets the rate of updating the photographed image to be relatively high (for example, three times per second).

In addition, an arrow shape setting section 109 sets a shape and a position of the guide arrow in accordance with the rate of updating the photographed image set by the photographed image updating rate setting section 110. Furthermore, a drawing control section 111 updates the photographed image and the guide arrow in accordance with the rate of updating the photographed image set by the photographed image updating rate setting section 110. In other words, in the present modified example, the photographed image and the guide arrow are simultaneously updated at the same updating rate.

As described above, the rate of updating the photographed image and the guide arrow is dynamically changed in accordance with a distance from a self-position of the vehicle to an intersection to which the vehicle is to be guided. Thus, at a point where a degree of the necessity for guidance is comparatively low (position where the vehicle is distant from an intersection to which the vehicle is to be guided), an effective guidance display can be presented with a low processing load. On the other hand, at a point where a degree of the necessity for guidance is comparatively high (position where the vehicle is close to an intersection to which the vehicle is to be guided), a rate of updating the photographed image is set to be relatively high, whereby a guidance display of great real-time nature can be presented to a user.

Note that as similarly to in the above-described embodiment, also in the present modified example, a rate of drawing the guide arrow may be dynamically changed in accordance with information pertinent to a rudder angle of a steering wheel and a shape of a road ahead of the vehicle, instead of a distance from a self-position of the vehicle to an intersection to which the vehicle is to be guided.

In the above embodiment and modified example, it is described that the guide arrow is superimposed on the photographed image of a scene ahead of the vehicle, which is shot by the camera. However, also when the guide arrow is superimposed on a photographed image which has been previously stored in a storage medium, the present invention is effective.

Note that the rate of drawing the arrow may be dynamically set based on information contained in the map data. For example, the rate of drawing the arrow may be dynamically set based on information pertinent to a shape of a road (the number of branch roads of an intersection, the number of lanes, etc.). In a case where the guidance is performed for a complicated form of roads, even when the guide arrow is only slightly deviated from a position of a road on the photographed image, viewability of the guidance display is reduced. At such a time, it is only required that the rate of drawing the arrow is set to be high.

The rate of drawing the arrow may be set to be high in accordance with weather. For example, in rainy weather, a windshield wiper in motion appears in an image shot by a camera. However, the rate of drawing the arrow is set to be higher than that set in fine weather, whereby screen flicker caused when the windshield wiper in motion appears in the image can be suppressed.

The rate of drawing the arrow may be dynamically set in accordance with a time of day. For example, in nighttime when a degree of risk in driving is high, further detailed guidance is required. In such a case, it is only required to set a higher rate of drawing the arrow than that set in daytime. As for information pertinent to whether it is in daytime or nighttime, for example, an illumination signal may be used.

The rate of drawing the arrow may be dynamically set in accordance with a CPU load. For example, during CD ripping, the CPU load increases. In such a case, it is only required to set the rate of drawing the arrow to be low.

The rate of drawing the arrow may be dynamically set in accordance with a condition of positioning performed by a GPS. For example, when the GPS has received nothing, a guidance accuracy markedly worsens. In such a case, it is only required to set the rate of drawing the arrow to be low.

The rate of drawing the arrow may be dynamically set in accordance with a condition of a road ahead of the vehicle. For example, when another vehicle is ahead of the vehicle, a road is blocked and the guidance is less effective. In such a case, it is only required to set the rate of drawing the arrow to be low.

While the embodiment and modified example of the present invention have been described above, the foregoing descriptions are merely illustrative but not restrictive, not limiting the technical scope of the present invention. It is understood that any modifications and variations can be devised within the scope in which effects of the present invention are exhibited.

A navigation apparatus according to the present invention is useful as a car navigation apparatus and the like, which is mounted in a vehicle. In addition, the navigation apparatus according to the present invention is useful as a navigation apparatus and the like in a mobile telephone.

The invention claimed is:

1. A navigation apparatus operable to perform route guidance by displaying a photographed image, comprising:
   a searching section for searching a route from a current position to a destination; and
   a drawing section for displaying a guide arrow which indicates the route searched by the searching section such that the guide arrow is superimposed on the photographed image; and
   a rate setting section for increasing and decreasing a frequency rate for which the drawing section updates the display of the guide arrow on the photographed image based on predetermined conditions such that the drawing section dynamically updates the display of the guide arrow on the photographed image when a predetermined condition is satisfied.

2. The navigation apparatus according to claim 1, wherein the rate setting section sets the frequency of updating the display of the guide arrow in accordance with a distance from a self-position of a vehicle to a point to which the vehicle is to be guided.

3. The navigation apparatus according to claim 2, wherein the rate setting section increases the frequency of updating the display of the guide arrow in accordance with an increase in the distance from the self-position of the vehicle to the point to which the vehicle is to be guided.

4. The navigation apparatus according to claim 1, wherein the rate setting section sets the frequency of updating the display of the guide arrow in accordance with a rudder angle of a steering wheel.

5. The navigation apparatus according to claim 4, wherein the rate setting section increases the frequency of updating the display of the guide arrow in accordance with an increase in the rudder angle of the steering wheel.

6. The navigation apparatus according to claim 1, wherein the rate setting section sets the frequency of updating the display of the guide arrow in accordance with a change amount per unit time of the rudder angle of the steering wheel.

7. The navigation apparatus according to claim 6, wherein the rate setting section increases the frequency of updating the display of the guide arrow in accordance with an increase in the change amount per unit time of the rudder angle of the steering wheel.

8. The navigation apparatus according to claim 1, wherein the rate setting section sets the frequency of updating the display of the guide arrow in accordance with a shape of a road ahead of the vehicle.

9. The navigation apparatus according to claim 8, wherein the rate setting section increases the frequency of updating the display of the guide arrow in accordance with an increase in a discrepancy between the shape of the road ahead of the vehicle and a shape of a course which would be taken if the vehicle proceeded along a traveling direction of the vehicle.

10. The navigation apparatus according to claim 1, wherein the rate setting section sets the frequency of updating the display of the guide arrow in accordance with weather.

11. The navigation apparatus according to claim 10, wherein the rate setting section sets the frequency of updating the display of the guide arrow to be higher in rainy weather than in fine weather.

12. The navigation apparatus according to claim 1, wherein the rate setting section sets the frequency of updating the display of the guide arrow in accordance with a time of day.

13. The navigation apparatus according to claim 12, wherein the rate setting section sets the frequency of updating the display of the guide arrow to be higher in nighttime than in daytime.

14. The navigation apparatus according to claim 1, wherein the rate setting section sets the frequency of updating the display of the guide arrow in accordance with a CPU load.

15. The navigation apparatus according to claim 14, wherein the rate setting section decreases the frequency of updating the display of the guide arrow during data operations on a CPU.

16. The navigation apparatus according to claim 1, wherein the rate setting section sets the frequency of updating the display of the guide arrow in accordance with a condition of positioning performed by a GPS (Global Positioning System).

17. The navigation apparatus according to claim 16, wherein the rate setting section decreases the frequency of updating the display of the guide arrow when the GPS has received nothing.

18. The navigation apparatus according to claim 1, wherein the rate setting section sets the frequency of updating the display of the guide arrow in accordance with a condition of a road ahead of the vehicle.

19. The navigation apparatus according to claim 18, wherein the rate setting section decreases the frequency of updating the display of the guide arrow when another vehicle is ahead of the vehicle.

20. The navigation apparatus according to claim 1, wherein the rate setting section dynamically sets the frequency of updating the display of the photographed image in accordance with a predetermined condition.

* * * * *